(12) United States Patent
Amioka (10) Patent No.: US 7,287,851 B2
(45) Date of Patent: Oct. 30, 2007

(54) EYEWEAR FRAME AND STORAGE MECHANISM

(76) Inventor: James Minoru Amioka, 57 Seth Sq., Plattsburgh, NY (US) 12901

( * ) Notice: Subject to any disclaimer, the term of this patent is extended or adjusted under 35 U.S.C. 154(b) by 80 days.

(21) Appl. No.: 11/163,454

(22) Filed: Oct. 19, 2005

(65) Prior Publication Data

US 2006/0256279 A1 Nov. 16, 2006

Related U.S. Application Data

(63) Continuation-in-part of application No. 10/908,505, filed on May 15, 2005.

(51) Int. Cl.
*G02C 5/16* (2006.01)
(52) U.S. Cl. .......................... 351/114; 351/41; 351/126; 63/5.1; 359/805
(58) Field of Classification Search .................. 351/41, 351/63, 110, 111, 113–115, 121, 158; 63/1.11, 63/3, 5.1; 359/804, 805
See application file for complete search history.

(56) References Cited

U.S. PATENT DOCUMENTS 4,720,186 A 1/1988 Douillard 4,826,309 A * 5/1989 VanNeste .................... 351/114

FOREIGN PATENT DOCUMENTS

CH 668 491 * 12/1988 ................. 351/150

* cited by examiner

*Primary Examiner*—Huy Mai
(74) *Attorney, Agent, or Firm*—Eric A Hanscom; Todd Langford (57) ABSTRACT

The present invention improves existing eyewear frames to provide a secure and convenient means for storage and transport of eyewear when it is not being worn on the face. The eyewear frames contain rimless or semi-rimless lenses, which may be, for example, prescription lenses, reading lenses, darkened lenses as in sunglasses, or protective lenses, or night-vision lenses. When not in use as eyeglasses, the eyewear can be folded into a band for the wrist, arm or ankle. The eyewear frames may be comprised of a flexible material that allow the earpieces or nosepiece or both to bend or twist.

2 Claims, 14 Drawing Sheets

EYEWEAR FRAME AND STORAGE MECHANISM

This application is a continuation in part from application Ser. No. 10/908,505, filed May 15, 2005. The present invention provides for a storage mechanism for eyeglasses based upon the construction of the eyewear frame.

BACKGROUND OF THE INVENTION

1. Field of the Invention

The field of the invention is eyewear, specifically frames for eyewear.

2. Description of Related Art

Frames for eyewear are well known in the art. Existing frames generally comprise a rigid or semirigid frame that fits over the eyes for holding a lens or a pair of lenses upon the face in front of the eyes, held in place upon the face by rigid or semi-rigid earpieces that fit behind the ears to hold the eyewear on the face. Alternatively, the eyewear may have a band that encircles the head and attaches to the eyewear to hold the eyewear in place. The eyewear also generally has a rigid piece that crosses the nose between the means for holding the lenses. If the eyewear has rigid earpieces, the earpieces generally fold across the lenses for storage.

Another alternative embodiment of known eyewear frames is the so-called "pince-nez" frames, which do not have earpieces, but the nosepiece is flexible and when worn, the pince-nez is held in place by friction and compression as the nosepiece causes the eyewear to pinch the bridge of the wearer's nose to hold the attached lenses before the wearer's eyes.

Also known in the art is the so-called "monocle," a single lens that is held In place before the eye by compressing the edges of the lens between the top and bottom of the human eye socket.

The existing art provides means for storing eyewear when it is not being worn on the face comprising a case or container for the eyewear. The eyeglasses case or container is cumbersome to carry, requiring a pocket or a satchel or purse if the wearer chooses not to carry the case in his or her hand. This can be inconvenient at times when the wearer either does not have a pocket or chooses not to carry a purse or satchel. Some eyeglasses wearers address this inconvenience by placing their eyeglasses on top of their heads, from whence the eyeglasses can easily fall and become lost or broken. Others wear a necklace or pin that they hook one earpiece through or around, where the eyeglasses can get in the way of various activities such as swimming, skiing, or other active sports or activities. Monocle wearers may have a strap or necklace attached to the lens which they wear around the neck or attached to a jacket, shirt or blouse button.

Lenses on pivot joints are also known. The inventor has seen a timekeeping watch in the marketplace which has one or more lenses pivotally attached to the watch's rim. The lens or lenses pivot up to form a binocular or telescope.

BRIEF SUMMARY OF THE INVENTION

The present invention provides a lens that may pivot out to allow the individual to use the lens to view something without removing the eyeglasses and converting them from the band form to the traditional eyeglasses form. A small optional memo pad may be attached to the frame for the person using the frame to write short reminders to him- or herself. The memo pad may be made of paper, of washable plastic, or of any other suitable writing surface material.

DETAILED DESCRIPTION OF THE INVENTION

Figure 1:
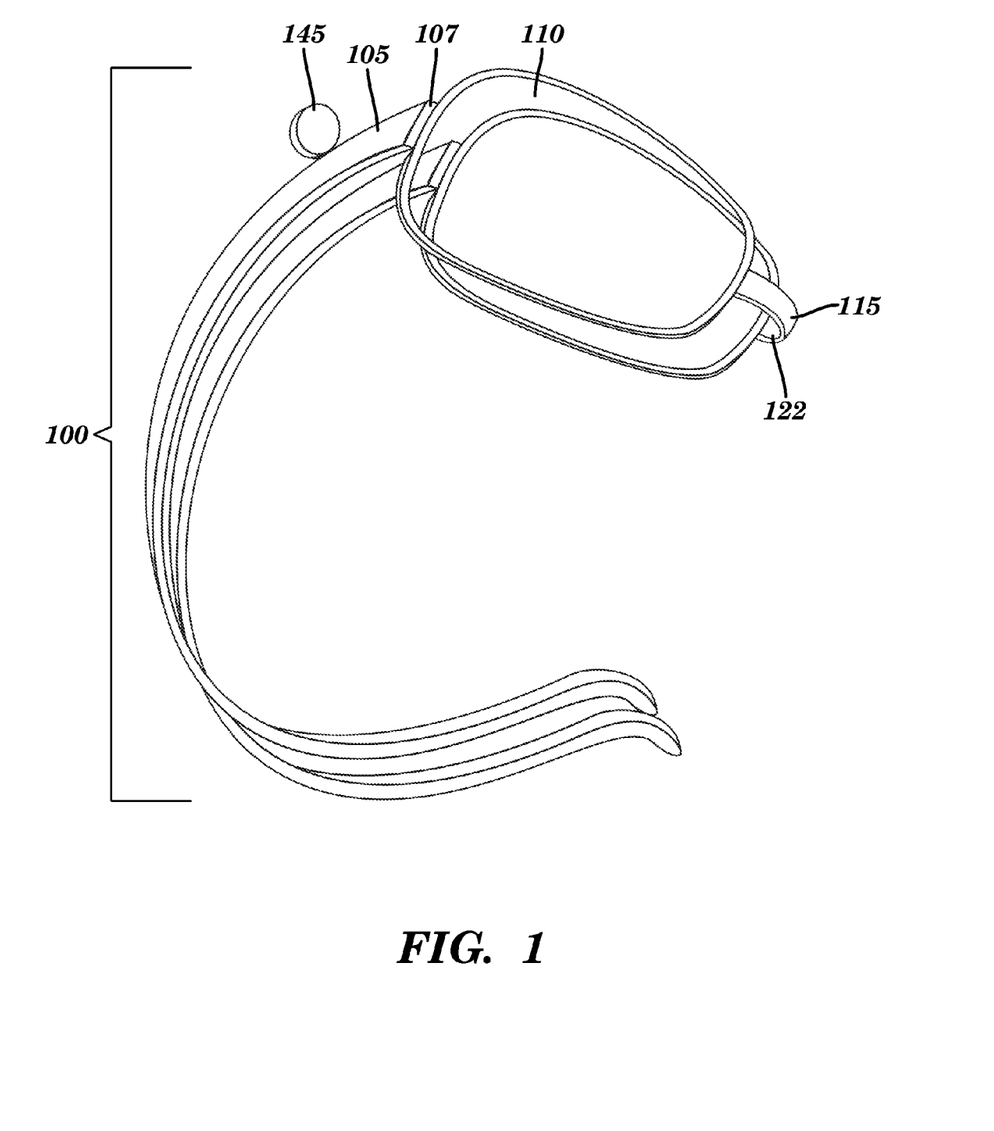
FIG. 1 shows the eyeglass frames with lenses attached, in the form of a band, armband or anklet.

Referring now to FIG. 1, eyewear 100 is shown folded in a band configuration. The earpieces 105 are next to each other, and the earpieces 105 are hingedly attached 107 to a pair of lenses 110. The eyewear lenses 110 are attached at a pivot 115 which also serves as the nosepiece 122. Earpieces 105 made of bendable material capable of being reconfigured between earpieces and a band many times without fatigue or breaking are attached to each lens 110 on the side opposite the pivot 115.

In the band configuration, the lenses 110 are closely adjacent to each other, and the earpieces 105 are curled to wrap around the wearer's wrist, arm, or ankle, with the lenses 110 forming a jewel on the band. The band is comprised of materials flexible enough to accommodate different sized wrists, arms, legs, and ankles. To open the band to form eyeglasses, the earpieces 105 are pulled to separate them from each other. The lenses 110, which are attached with hinges 117 to the earpieces 105, are simultaneously pulled apart by the pulling action on the earpieces 105 until the lenses 110 are adjacent to each other across a nosepiece 122 in the form of eyeglasses 130. The flexible earpieces 105 can then be wrapped around the wearer's ears.

The lenses 110 used in the eyewear 100 may be of any type, including but not limited to prescription lenses, sunglasses, reading glasses, protective lenses, or lenses such as night vision lenses.

There is an optional small lamp 145 attached to the eyewear 100 on the earpiece 105.

Figure 2:
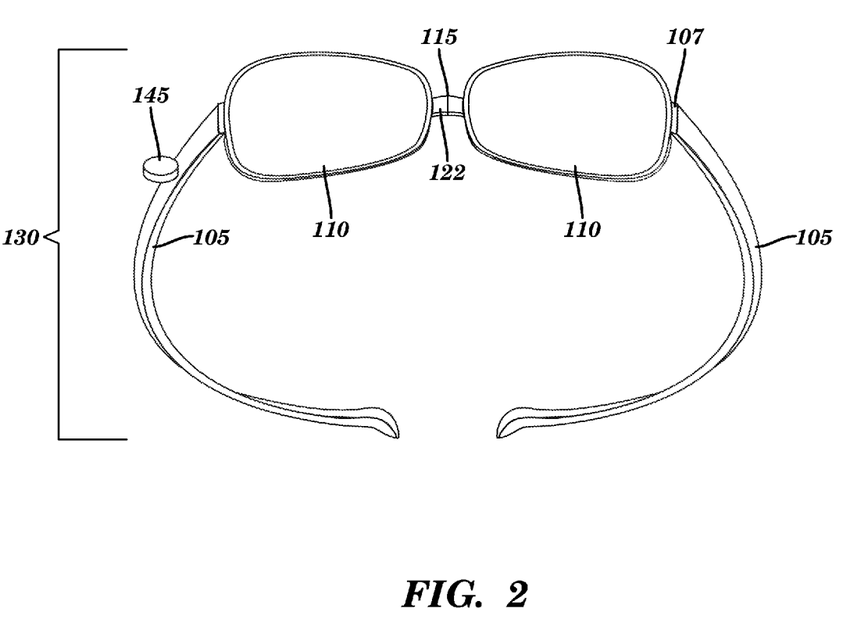
FIG. 2 shows the band form of the eyeglass frames opening out to form traditional eyeglasses.

Referring now to FIG. 2, eyewear 100 is shown expanded into eyeglasses 130, with two earpieces 105, two lenses 110 configured to rest before a pair of human eyes, and a nosepiece 122. The nosepiece 122, which is comprised of either a flexible material or of an inflexible material with a joint 115 in the center of the nosepiece 122, also serves as a pivot 115 when the eyewear 100 is in the band configuration. A small optional light 145 is attached to an earpiece 105.

Figure 3:
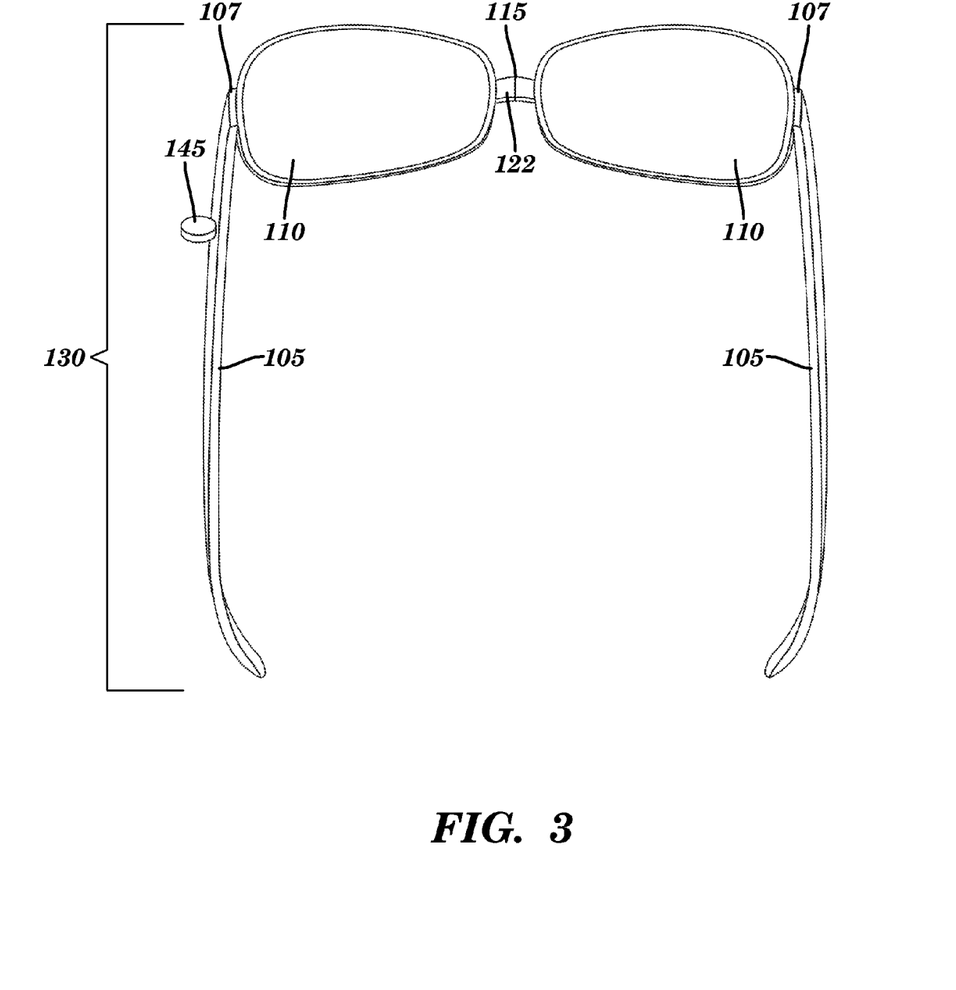
FIG. 3 shows the fully expanded eyeglasses.

Referring now to FIG. 3, the eyewear 100 is shown fully extended into the configuration of eyeglasses 130. A small optional light 145 is attached to an earpiece 105.

Figure 4:
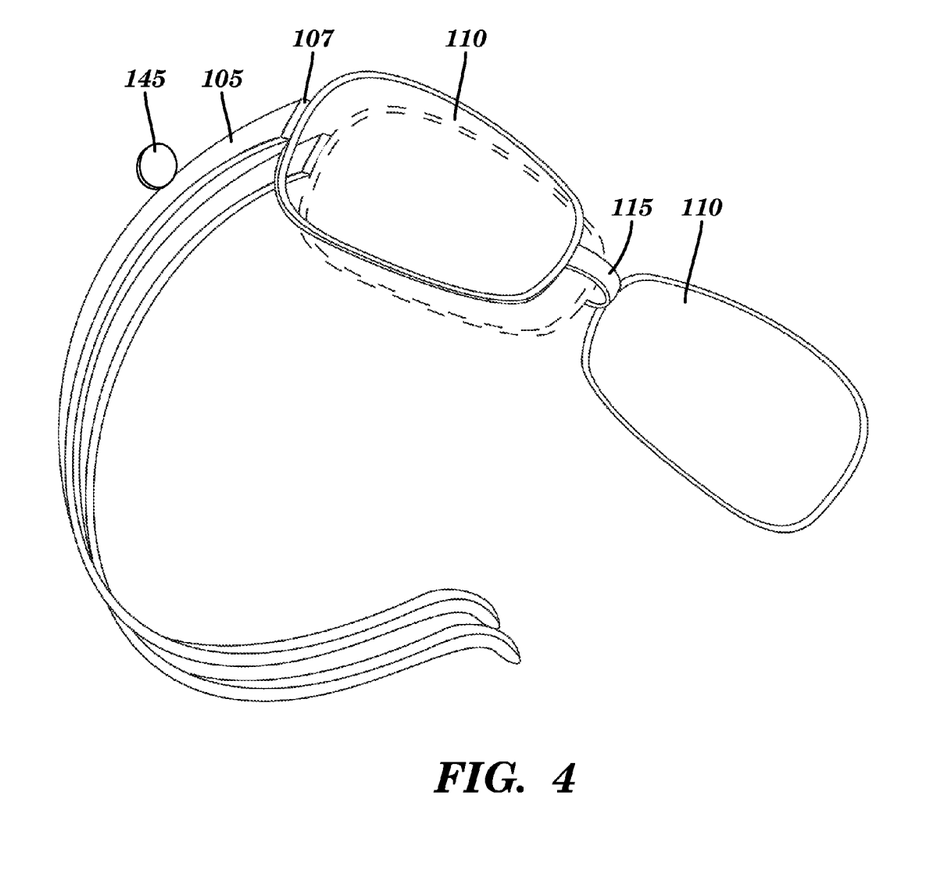
FIG. 4 shows the eyeglasses in band form with a lens extended for reading or other viewing with the eyeglasses in band form.

Referring now to FIG. 4, the eyewear 100, shown in the band configuration, may optionally have a joint 115 that allows one lens 110 to rotate or pivot such that the one lens 110 can be positioned, while the eyewear 100 is in the band configuration, in a way that the wearer can use the one lens 110 to look through for functions such as reading small print, magnification or other functions. The eyewear 100 may also optionally have a set of clips 125 for holding a small optional memo pad 135. The memo pad 135 may be made of whiteboard material, paper, blackboard material, or any other suitable writing surface. The memo pad 135 may be washable.

Figure 5:
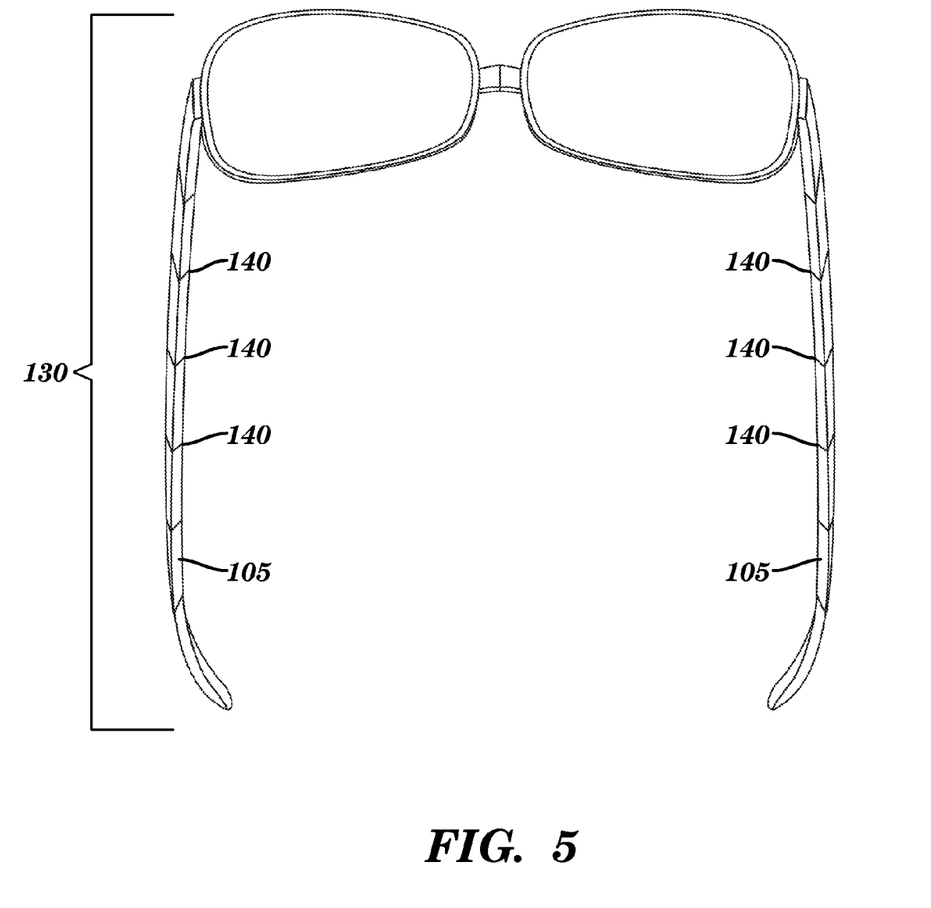
FIG. 5 shows the earpieces to the eyeglasses comprising a stiffer material and hinged to allow the earpieces to be locked into place in either the band or the eyeglasses configuration.

Referring now to FIG. 5, the eyewear 100 is shown in the eyeglasses configuration 130. The earpieces 105 in this embodiment are made of a stiff plastic or metal material, and comprise one or a plurality of links 140 to enable the earpieces to be reconfigured between the eyeglasses configuration and the band configuration with a reliable return to the other configuration each time the eyewear is converted between eyeglasses and a band.

Figure 6:
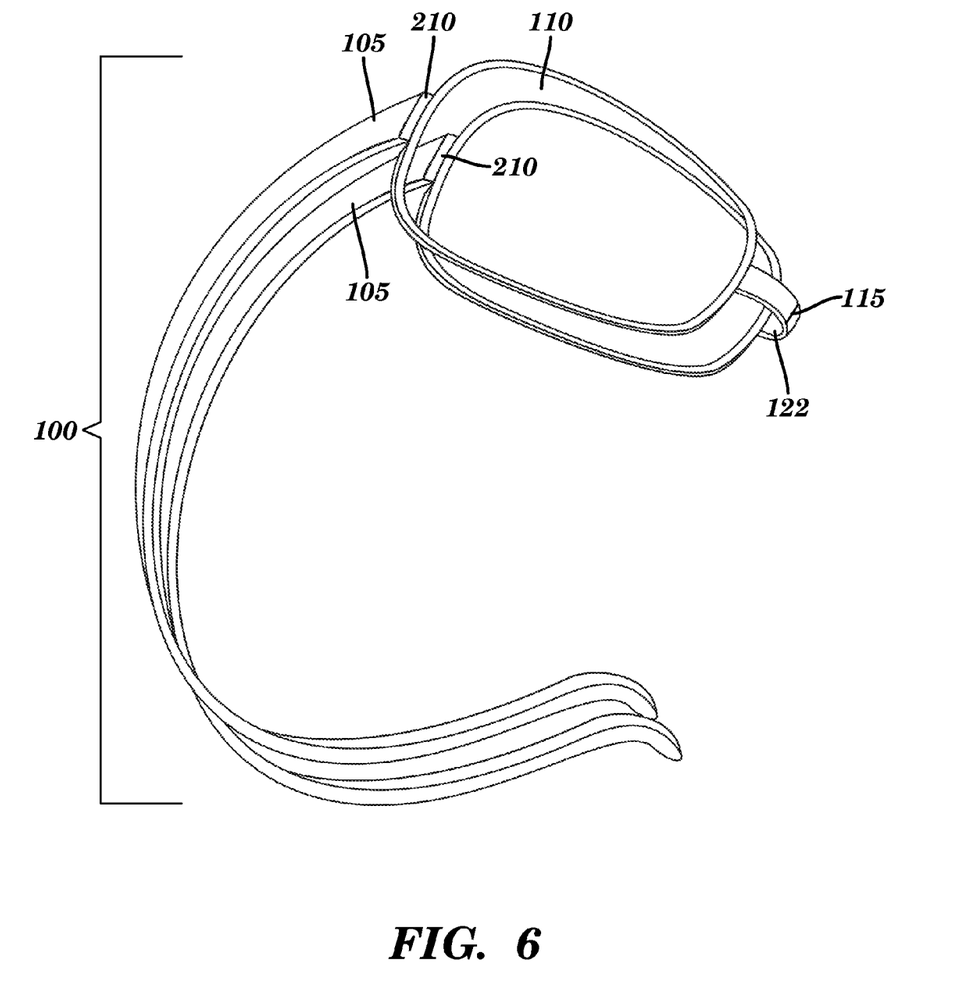
FIG. 6 shows the eyeglasses in band form, clipped together at the nosepiece.

Referring now to FIG. 6, eyewear 100 is shown in a band configuration, with earpieces 105 next to each other, lenses 110 next to each other, and a pivot 115 that converts into a nosepiece 122. An optional block 210 prevents the earpieces 105 from moving too far inward.

Figure 7:
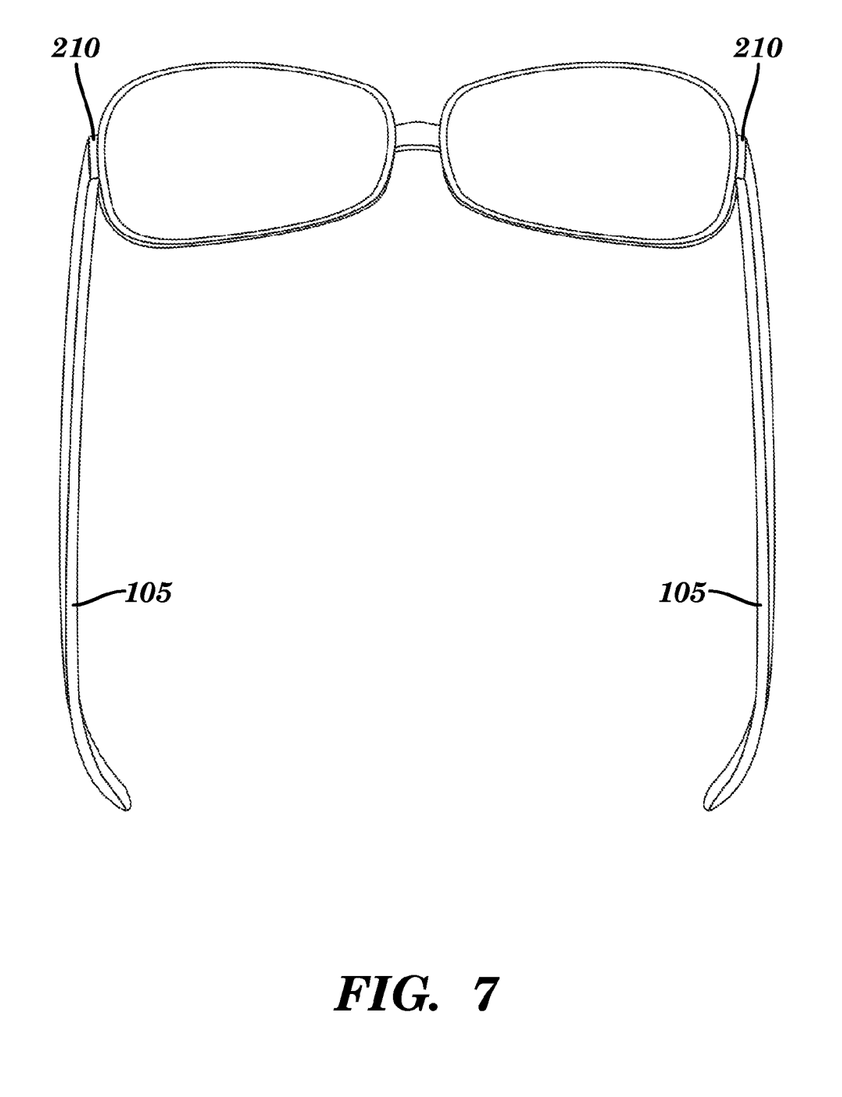
FIG. 7 shows the eyeglasses in expanded form with blocks to prevent the earpieces from moving too far inward.

Referring now to FIG. 7, eyeglasses 130 are shown with the optional block 210 preventing the earpieces 105 from moving too far inward.

Figure 8:
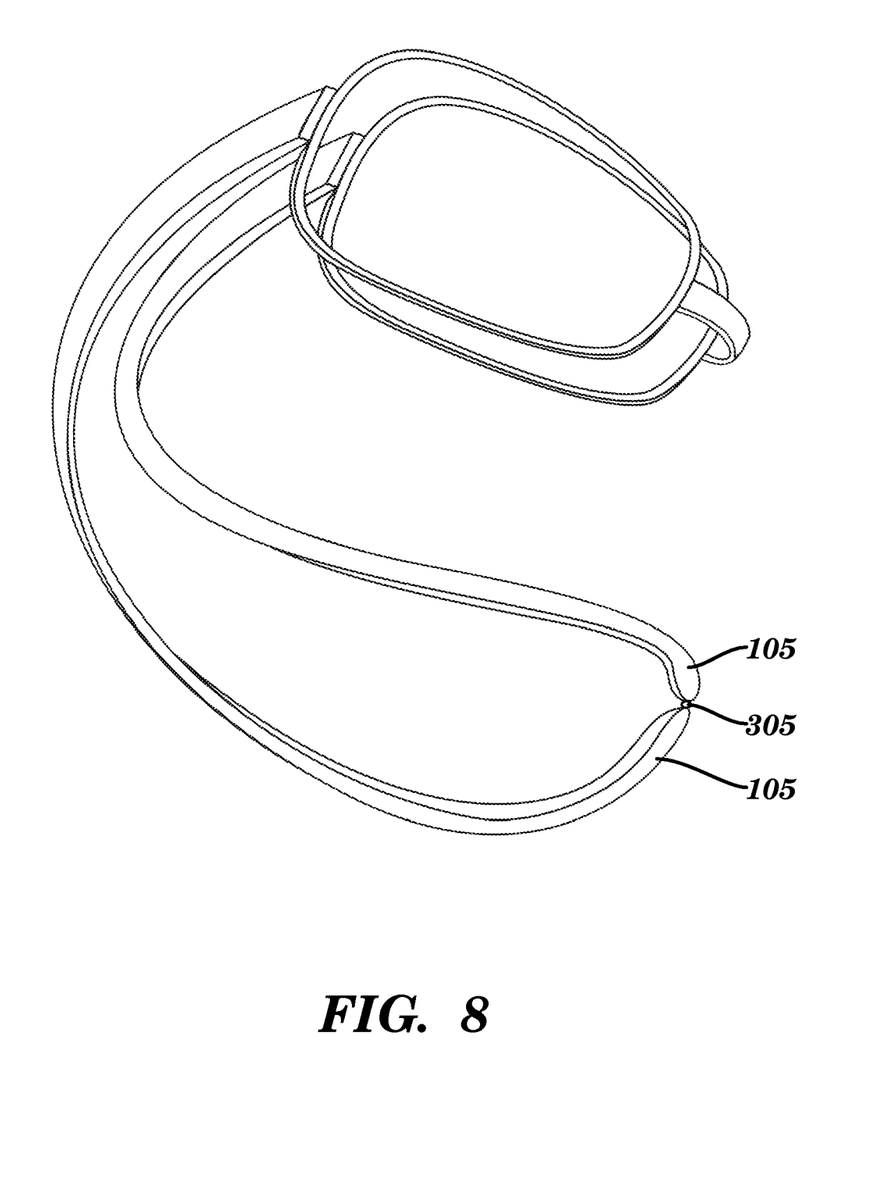
FIG. 8 shows the eyeglasses in band form, clipped together at the end of each earpiece.

Referring now to FIG. 8, the eyewear 100 is shown in a band configuration wherein the earpieces 105 are separated and surround the wearer's arm, wrist, ankle or leg. The earpieces 105 are joined at the ear end by a clasp 305, such as a jewelry clasp.

Figure 9:
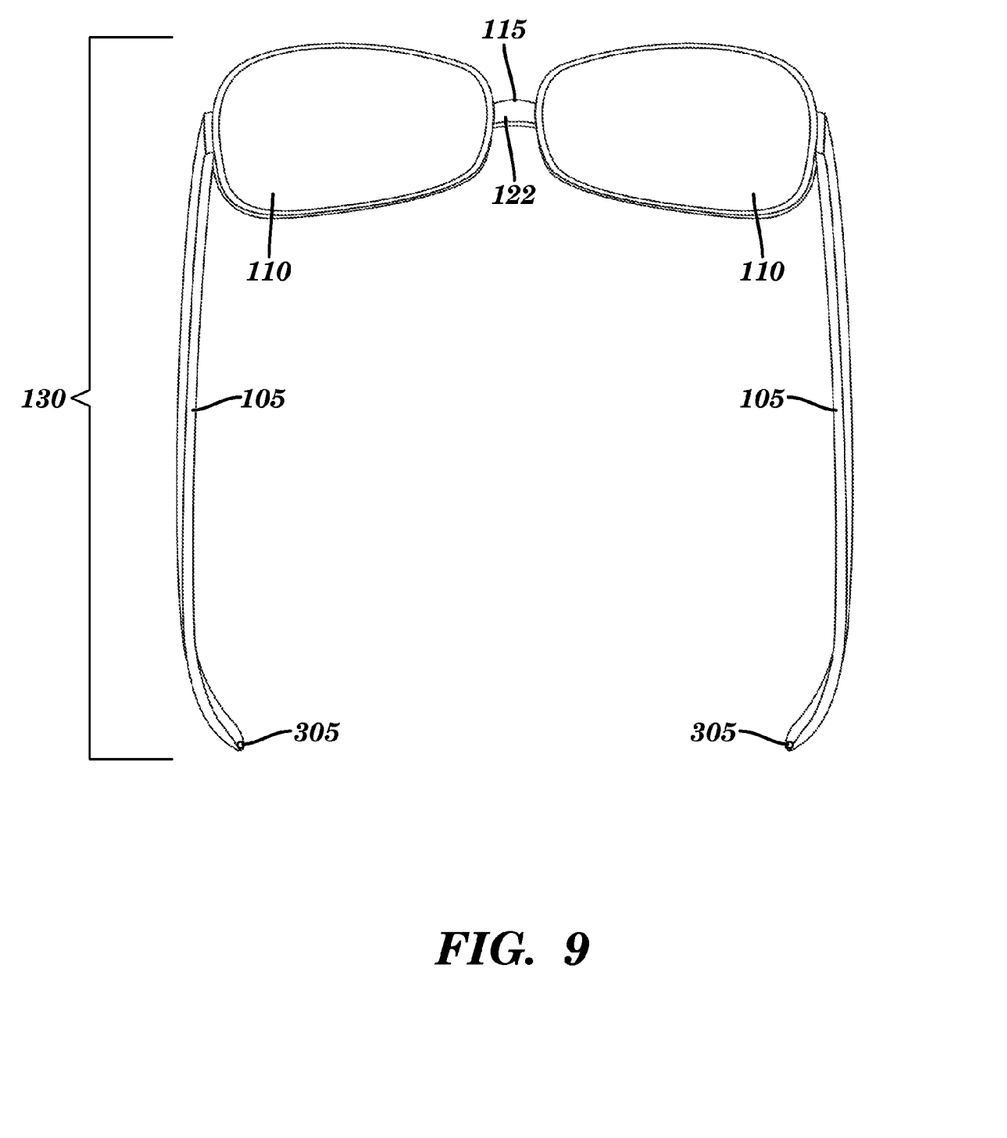
FIG. 9 shows the eyeglasses in expanded form.

Referring now to FIG. 9, eyeglasses 130 are shown fully expanded. The lenses 110 are in the configuration that is normal for eyeglasses in general, the pivot 115 forms the nosepiece 122, and the earpieces 105 are extended to fit the wearer's head. The clasp 305 is disengaged at the end of each earpiece 105.

Figure 10A:
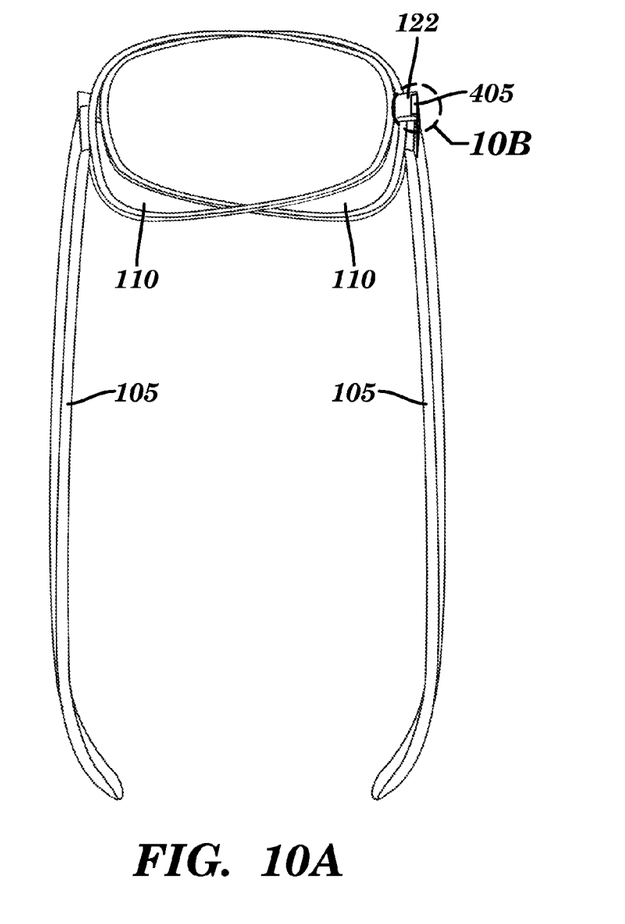
FIG. 10A shows the eyeglasses in band form with a sliding mechanism.

Referring now to FIG. 10A, the eyewear 100 is shown halfway between the band configuration and the fully extended eyeglasses configuration. The nosepiece 122 halves are detached and the lenses 110 move laterally across one another to attach to the opposite lens's 110 earpiece 105 with a clasp 405.

Figure 10B:
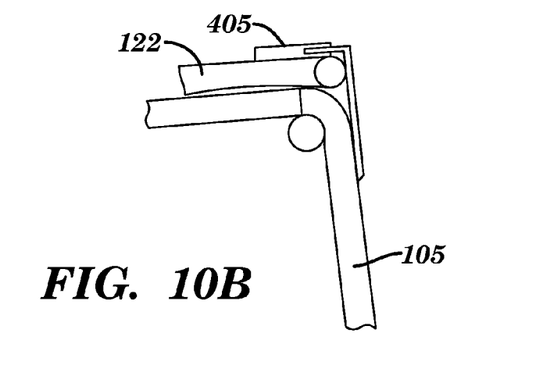
FIG. 10B shows a detail view of the sliding mechanism.

Referring now to FIG. 10B, a detailed view of the clasp 405 is shown with the eyewear positioned halfway between the band configuration and the fully extended eyeglasses configuration. The nosepiece 122 halves are detached and the lenses 110 move laterally across one another to attach to the opposite lens's 110 earpiece 105 with a clasp 405.

Figure 11:
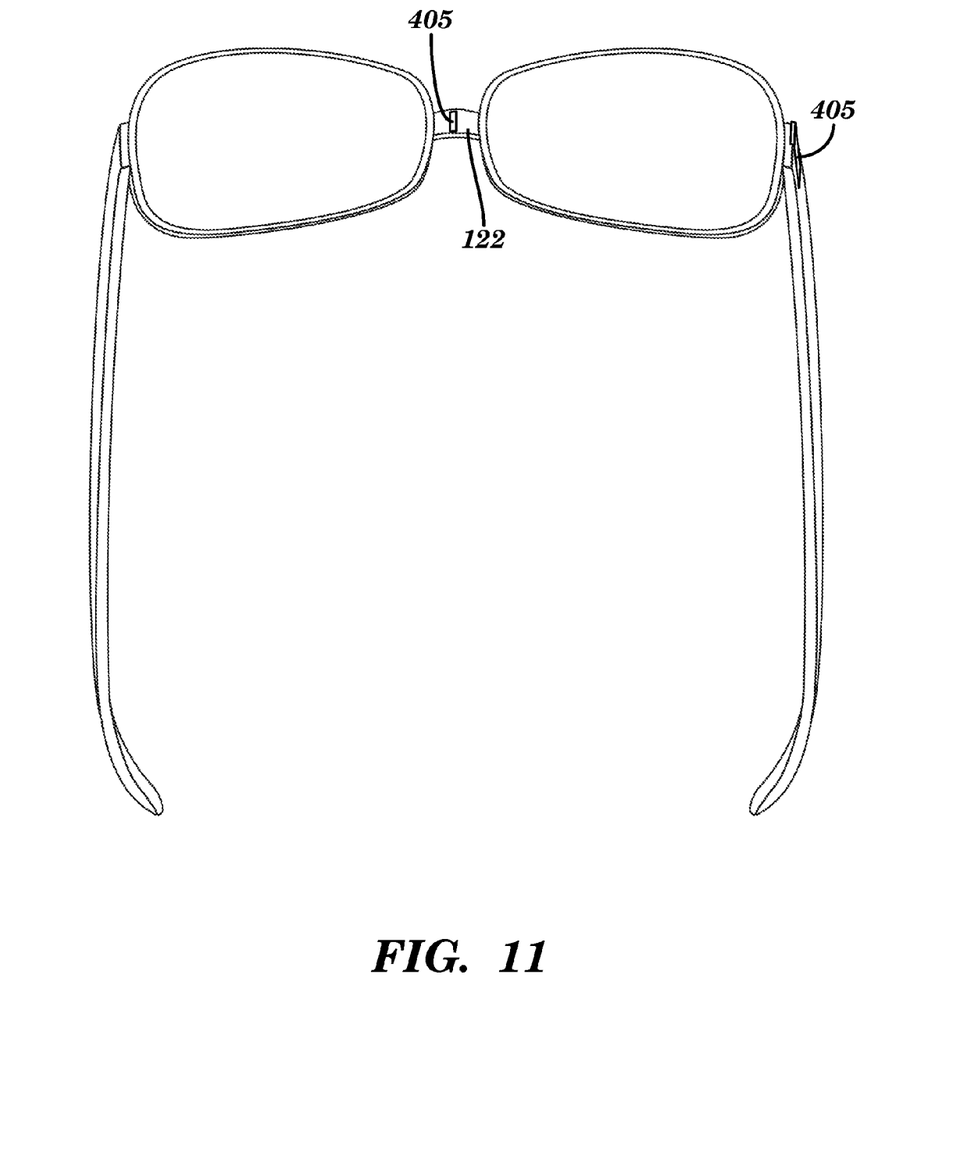
FIG. 11 shows the eyeglasses in expanded form, held together with a clip on the nosepiece.

Referring now to FIG. 11, the eyeglasses 130 are shown fully expanded. The clasp 405 is used to hold the nosepiece 122 together as a nosepiece for eyewear.

Figure 12:
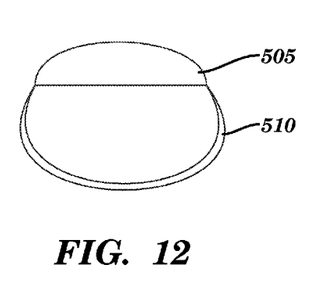
FIG. 12 shows a protective shell for the lenses to the eyewear for use when the eyewear is worn in band form on the arm, leg, wrist, or ankle. When the eyewear is worn in eyeglasses form, the protective shell can remain on the wearer's extremity. The protective shell can be manufactured in any color to meet the wearer's fashion sense.

Referring now to FIG. 12, an optional cover 505 is shown. The cover 505 can be used to protect the lenses 110 (not shown) from damage when the eyewear 100 (not shown) is being worn in the band configuration. The cover 505 is formed from a durable material that can be formed to cover the lenses 110 (not shown). The cover 505 has a cover band 510 formed of a flexible material that can be used to hold the cover 505 on the arm when the cover 505 is not being used to protect the lenses 110 (not shown).

Figure 13:
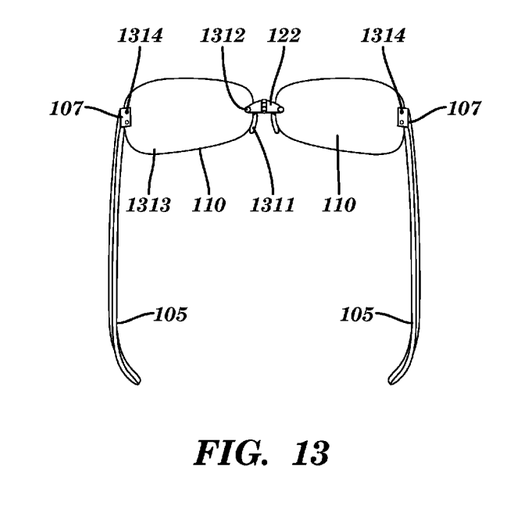
FIG. 13 shows the lenses as they would appear in the eyewear in a rimless design.

Referring now to FIG. 13, the lenses 110 may be housed within the eyewear in a rimless design. In such a configuration, the nosepiece 122 is attached directly onto the nose end 1311 of each lens 110 using an attachment mechanism 1312 that may be bolts, rivets, screws, glue, or another, similar, mechanism. The earpieces 105 are hingedly attached directly to the ear end 1313 of each lens 110 using an attachment mechanism 1314 that may be bolts, rivets, screws, glue, or another, similar, mechanism.

Figure 14:
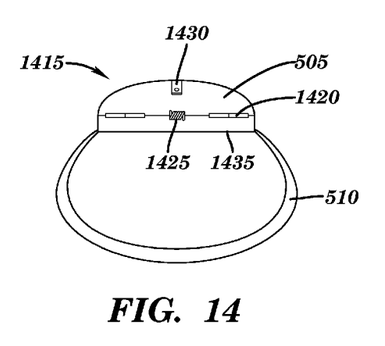
FIG. 14 shows the protective shell as it would appear designed as a clamshell that surrounds the lenses when the eyewear is in the bracelet or anklet formation.

Referring now to FIG. 14, the optional cover 505 may be formed using a clamshell 1415 design, wherein the cover 505 surrounds the lenses 110 (not shown). The cover 505 has a hinge 1420 on one side that allows the cover to open and close. The hinge 1420 may be mounted with a spring 1425 to keep it open or shut, or the hinge may be held closed by a clasp 1430 on the opposite side of the cover 505. A bottom side 1435 of the clamshell 1415 Is substantially flattened, allowing the clamshell 1415 to be comfortable to wear on an arm or a leg. Whether the lenses 110 are rimmed or rimless is immaterial to the design of the optional cover 505.

Figure 15:
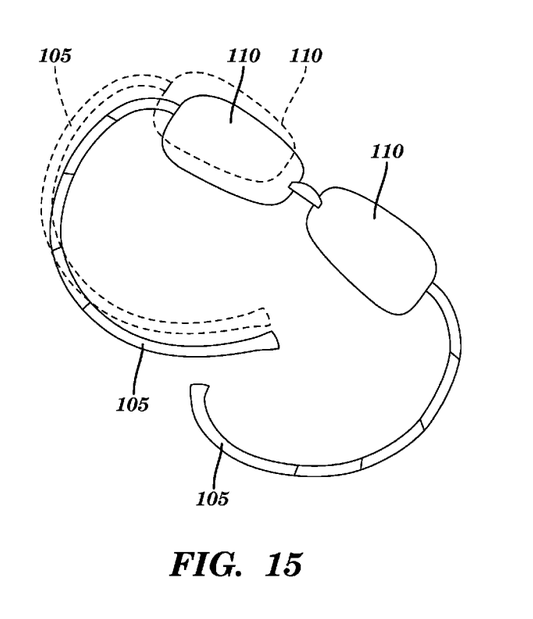
FIG. 15 shows the rimless or semi-rimless design feature of flipping or pivoting a lens up for viewing; the earpiece of that lens travels with the moving lens.

Referring now to FIG. 15, a rimless or semi-rimless frame 1505 is shown in the band configuration with a lens 110 pivoted into a viewing position (see FIG. 4). Note that the earpiece 105 that is attached to the lens 110 being pivoted travels with the rimless or semi-rimless lens 110.

Figure 16:
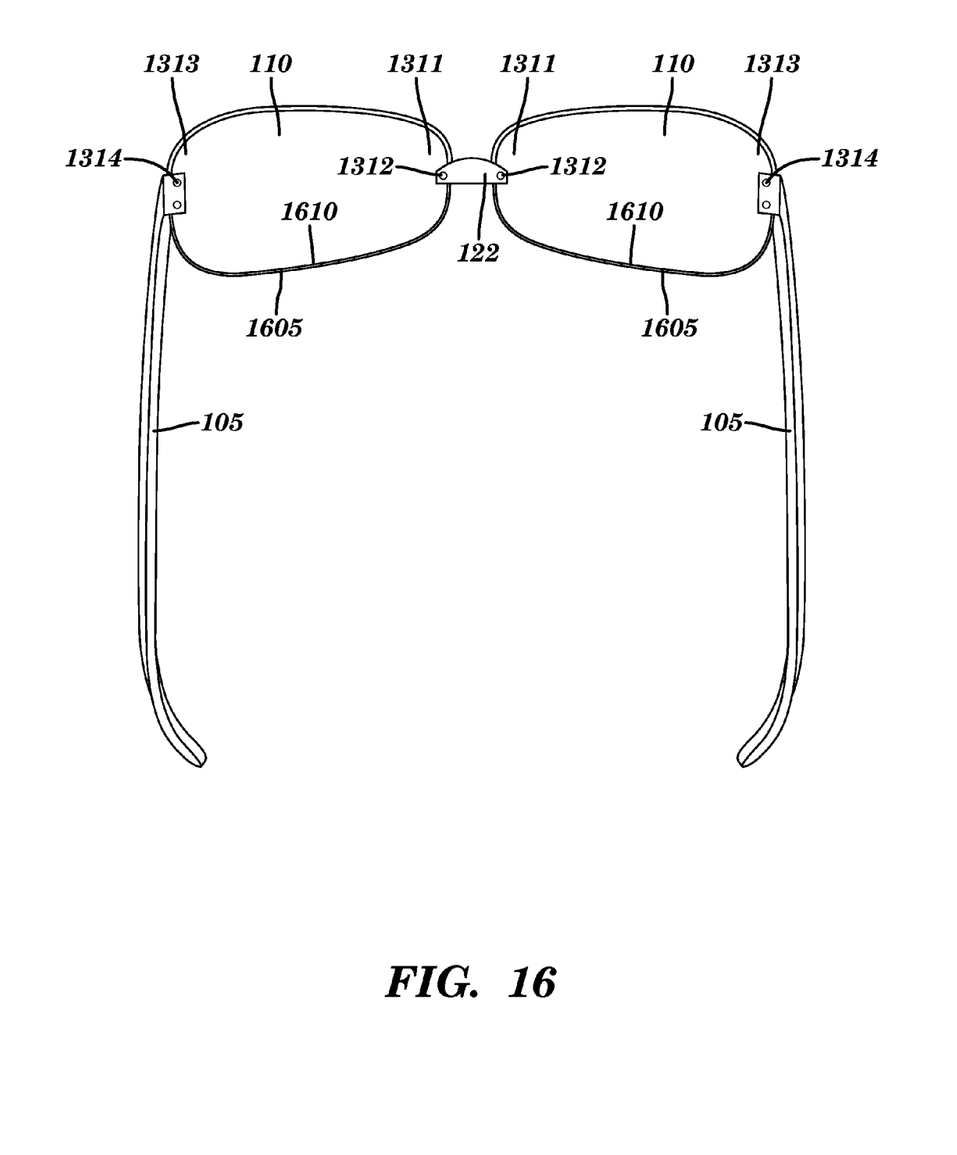
FIG. 16 shows lenses housed within the eyewear in a semi-rimless design.

Referring now to FIG. 16, the lenses 110 may be housed within the eyewear in a semi-rimless design. In such a configuration, the nosepiece 122 is attached directly onto the nose end 1311 of each lens 110 using an attachment mechanism 1312 that may be bolts, rivets, screws, glue, or another, similar, mechanism. Alternatively, in the rimmed or semi-rimless design, the nosepiece 122 may be attached to the frame 100 using an attachment mechanism 1312 that may be bolts, rivets, screws, glue, a one-piece design, or another, similar, mechanism. The earpieces 105 are hingedly attached directly to the ear end 1313 of each lens 110 using an attachment mechanism 1314 that may be bolts, rivets, screws, glue, or another, similar, mechanism. Alternatively, in the rimmed or semi-rimless design, the earpieces may be attached to the frame 100 using an attachment mechanism that may be bolts, rivets, screws, glue, or another, similar, mechanism. The lenses 110 in the rimless or semi-rimless design may be held in place using any of the standard methods of holding such lenses in place, including but not limited to glue, bolts, rivets, screws, and nylon string 1605 surrounding the bottom part 1610 of the lens 110 and attaching to the eyewear at the nose end 1311 and ear end 1311 of each lens 110.

For any embodiment of the invention, nosepads 1615 may attach directly to the nose end 1311 of each lens 110 or to the frame 100 or nosepiece 122.

For any embodiment of this invention, the lenses 110 may be of any type that can be used in standard eyewear, including but not limited to reading lenses, darkened lenses for sunglasses, prescription lenses, plate glass or optically inert plastic lenses, protective lenses, and night vision lenses, or any combination of lens types (for example, prescription sunglasses).

While a preferred embodiment is shown and described herein, it should be understood that the present disclosure is made by way of example only and that variations in the described device and its uses are possible within the scope of this disclosure without departing from the subject matter coming within the scope of claims to be examined, and a reasonable equivalency thereof, which I regard as my invention.

I claim:

1. Eyewear comprising:

a frame selected from the group consisting of rimless and semi-rimless;

two lenses, namely a right lens and a left lens, one or both of said lenses being pivotally affixed to said frame using an element selected from the group consisting of glue, rivets, bolts, and screws, said lenses being selected from the group consisting of prescription lenses, sunglasses, reading glasses, protective lenses, and night-vision lenses, and each lens having an inside which, when worn as eyeglasses, is situated adjacent to a user's eye, an outside which is situated opposite said inside, a nose end which is situated next to said user's nose, and an ear end which is situated opposite said nose end;

two earpieces, namely a right earpiece and a left earpiece, said earpieces each comprising a lens end, a midsection, and an ear end, and each of said earpieces being flexible, said flexibility being achieved by use of a flexible material, such that said earpieces can be reconfigured multiple times, without breaking or becoming fatigued, as either earpieces or a band, such that said eyewear may be worn as either eyeglasses or as a band surrounding an arm, wrist, leg, or ankle, said earpieces being hingedly affixed to a member of the group consisting of said frame and said one of said lenses by an element selected from the group consisting of glue, rivets, bolts, and screws; and a nosepiece, said nosepiece being flexible and comprising two lens ends, and a midsection, each lens end of said nosepiece being pivotally affixed to one of said lenses, said flexibility being achieved by use of a member selected from the group consisting of flexible material, such that said nosepiece can be reconfigured multiple times without breaking or becoming fatigued, a hinged joint located substantially in the center of said nosepiece, and a detachable joint located substantially in the center of said nosepiece.

2. The eyewear of claim 1 further comprising a member of the group consisting of said left lens and said right lens being pivoted into a viewing position when said eyewear is in said band configuration such that a user can look through said lens while said eyewear is in said band configuration for a purpose selected from the group consisting of reading and magnification.

\* \* \* \* \*